(12) United States Patent
Chiang

(10) Patent No.: US 8,434,922 B2
(45) Date of Patent: May 7, 2013

(54) PORTABLE ELECTRONIC DEVICE

(75) Inventor: Chia-Chin Chiang, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 767 days.

(21) Appl. No.: 12/650,422

(22) Filed: Dec. 30, 2009

(65) Prior Publication Data

US 2011/0075442 A1    Mar. 31, 2011

(30) Foreign Application Priority Data

Sep. 30, 2009   (CN) .......................... 2009 1 0307992

(51) Int. Cl.
*F21V 7/22* (2006.01)
*G09F 13/18* (2006.01)

(52) U.S. Cl.
USPC ......................................... 362/606; 362/609

(58) Field of Classification Search .................. 362/606, 362/613, 558
See application file for complete search history.

(56) References Cited

U.S. PATENT DOCUMENTS

2006/0146565 A1* 7/2006 Lee ............................... 362/606

FOREIGN PATENT DOCUMENTS

| CN | 1264055 A | 8/2000 |
|---|---|---|
| CN | 1897737 A | 1/2007 |
| CN | 101230970 A | 7/2008 |
| CN | 201194404 Y | 2/2009 |
| TW | M328573 | 3/2008 |

* cited by examiner

*Primary Examiner* — Joseph L Williams
(74) *Attorney, Agent, or Firm* — Altis Law Group, Inc.

(57) ABSTRACT

A portable electronic device includes a motherboard including at least one illuminator disposed thereon, a display screen parallel to the motherboard, and a light guide component disposed between the illuminator and the display screen. The light guide component includes a main body attached to a bottom surface of the display screen, and at least one foot portion extending from an edge of the main body corresponding to the at least one illuminator. The main body includes a light output surface facing the display screen. Each foot portion includes a distal end surface facing the illuminator to receive light emitted therefrom.

14 Claims, 5 Drawing Sheets

PORTABLE ELECTRONIC DEVICE

BACKGROUND

1. Technical Field

The present disclosure relates to electronic devices and, particularly, to a portable electronic device.

2. Description of Related Art

A conventional portable electronic device, such as a mobile phone, often includes a display screen, a motherboard, and a number of keys electrically connected to the motherboard. Furthermore, a number of light emitting diodes (LEDs) may also be positioned beside the display screen, to provide light in the absence of ambient lighting. The LEDs are embedded in an additional printed circuit board (PCB), separate from the motherboard. Conventionally, the PCB is positioned parallel or perpendicular to the motherboard and electrically connected thereto by flex cables. The LEDs may be electrically connected to the keys via circuitry on the PCB and the flex cables. Pressure on a key causes the LEDs to emit light to illuminate the display screen. However, the additional PCB increases cost and size of the portable electronic device, and connection to the motherboard by flex cable complicates structure and manufacture.

Therefore, it is desirable to provide a portable electronic device which can overcome or at least alleviate the limitations described.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
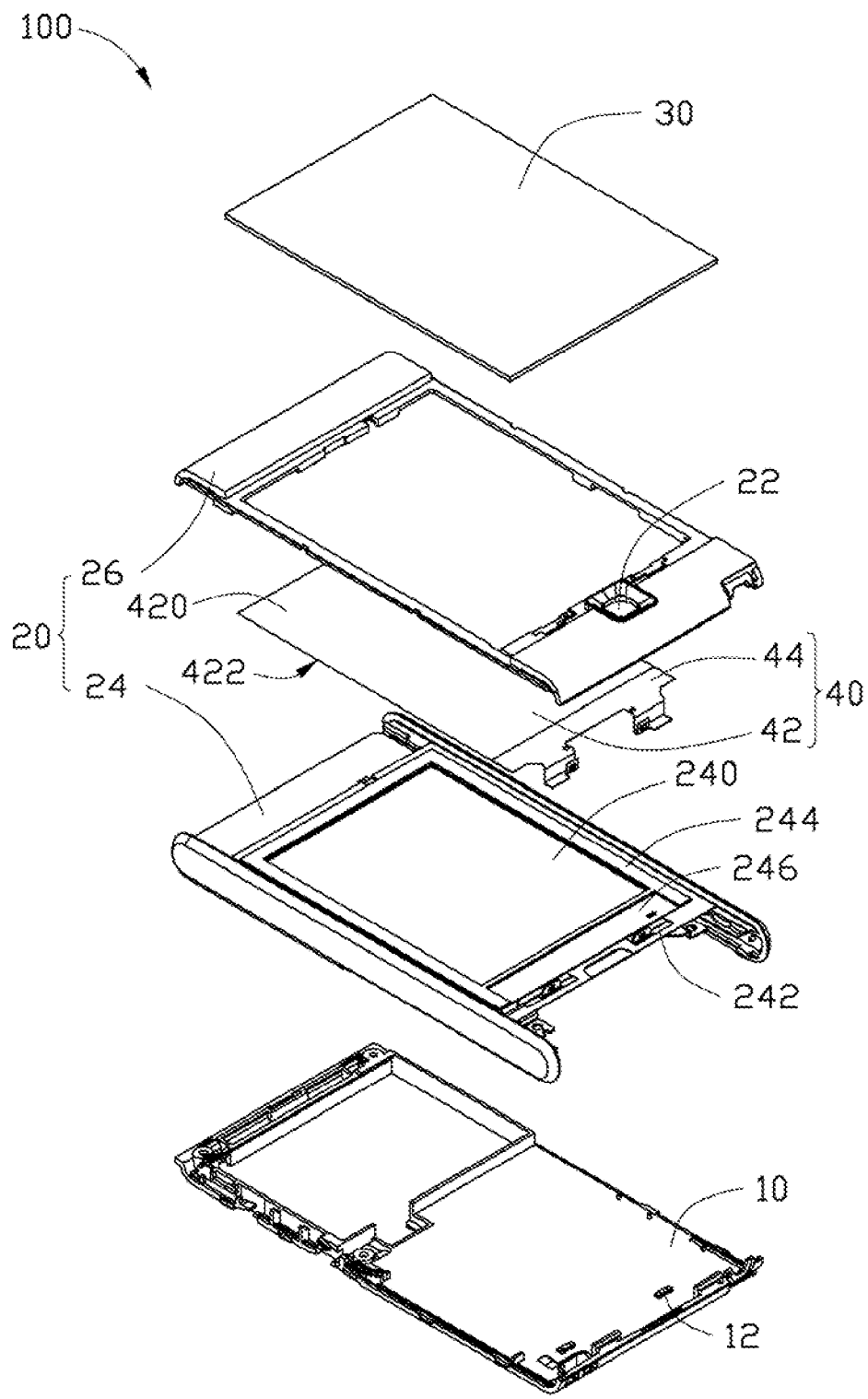
FIG. 1 is an isometric, exploded view of a portable electronic device, according to an exemplary embodiment.
Figure 2:
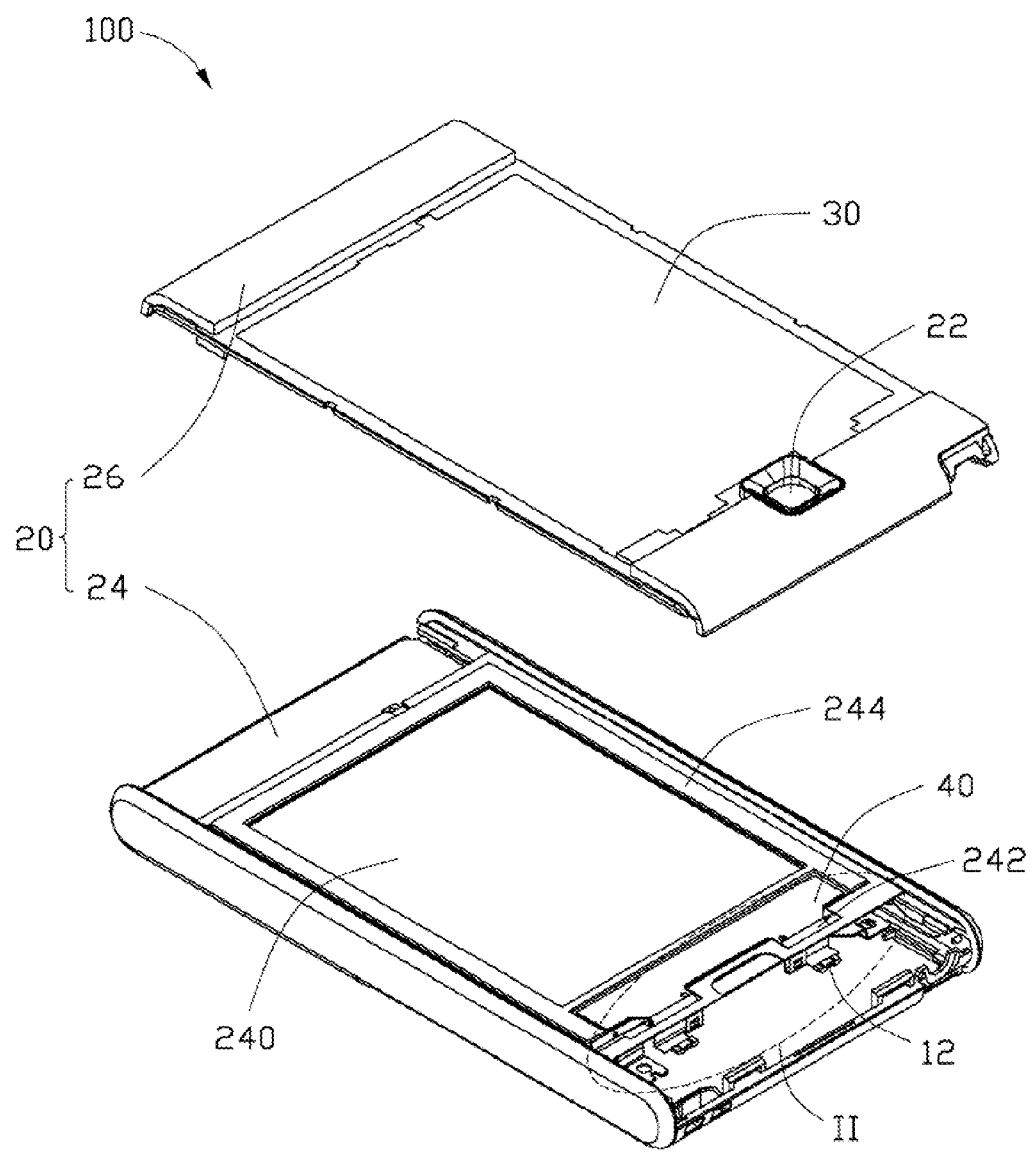
FIG. 2 is an isometric, partially exploded view of the portable electronic device of FIG. 1.

Referring to FIGS. 1 and 2, a portable electronic device 100 includes a motherboard 10, an outer shell 20 for covering the motherboard 10, and a display screen 30 embedded in the outer shell 20 and parallel to the motherboard 10. In this embodiment, the portable electronic device 100 is a mobile phone. A light guide component 40 is disposed between the motherboard 10 and the display screen 30.

The motherboard 10 includes two illuminators 12 electrically connected to a power supply (not shown) therein. In this embodiment, the illuminators 12 are light emitting diodes (LEDs).

The motherboard 10 further includes a control module (not shown) electrically connecting the illuminators 12 to a key 22 disposed on the outer shell 20. The control module is configured for turning on the illuminators 12 when a key 22 is pressed.

The outer shell 20 includes a holding frame 24 and a cover 26 attached to the holding frame 24. The holding frame 24 defines a first receiving opening 240 configured for receiving the display screen 30, and a number of through holes 242 located on the holding frame 24. In this embodiment, the outer shell 20 includes a bezel 244 surrounding the first receiving opening 240 for securing the display screen 30. The through holes 242 are disposed at a side of the bezel 244 and respectively corresponding to the illuminators 12. A receiving space 246 is defined between the first receiving opening 240 and the through holes 242.

Figure 3:
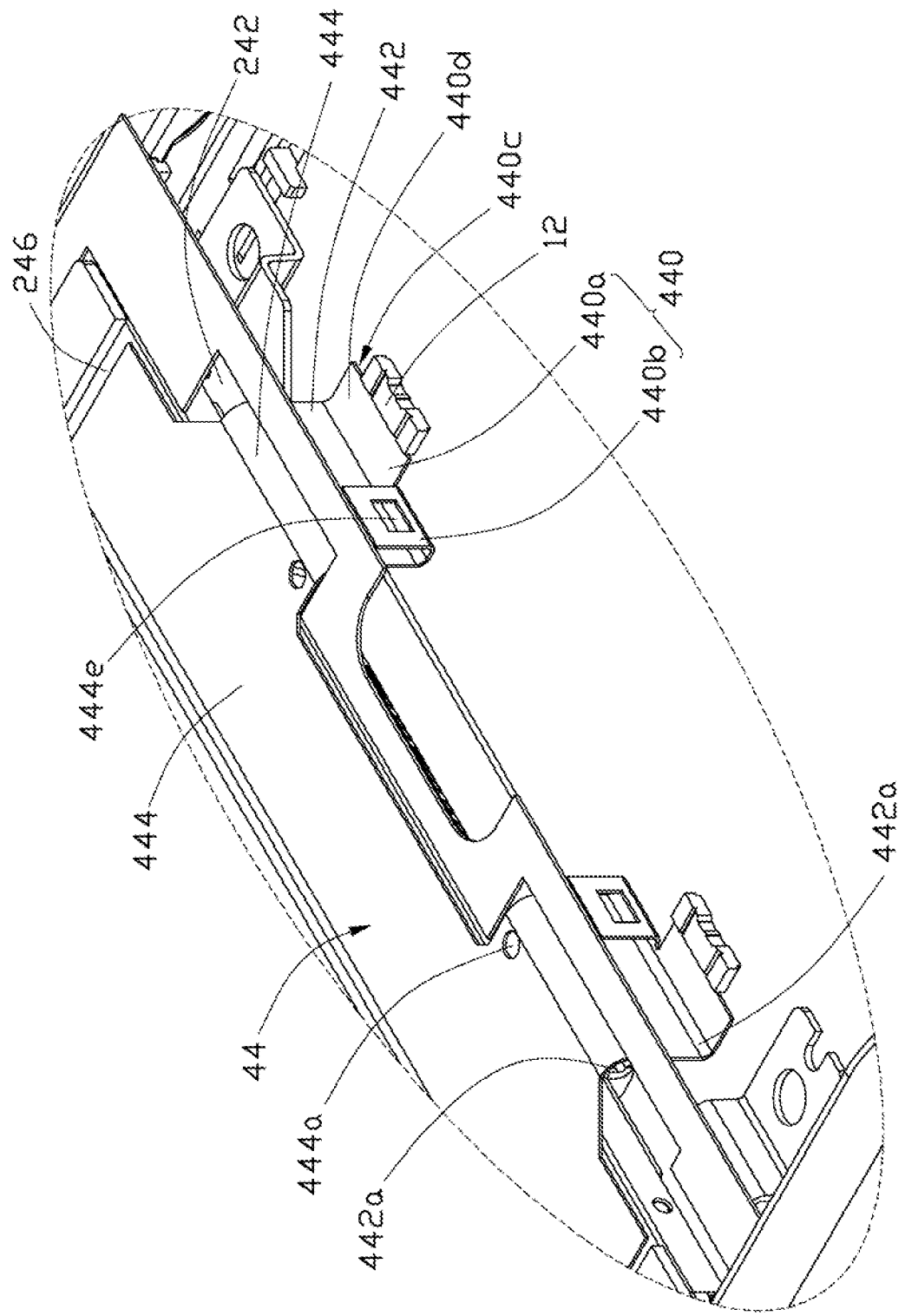
FIG. 3 is an enlarged view of part II of FIG. 2.
Figure 4:
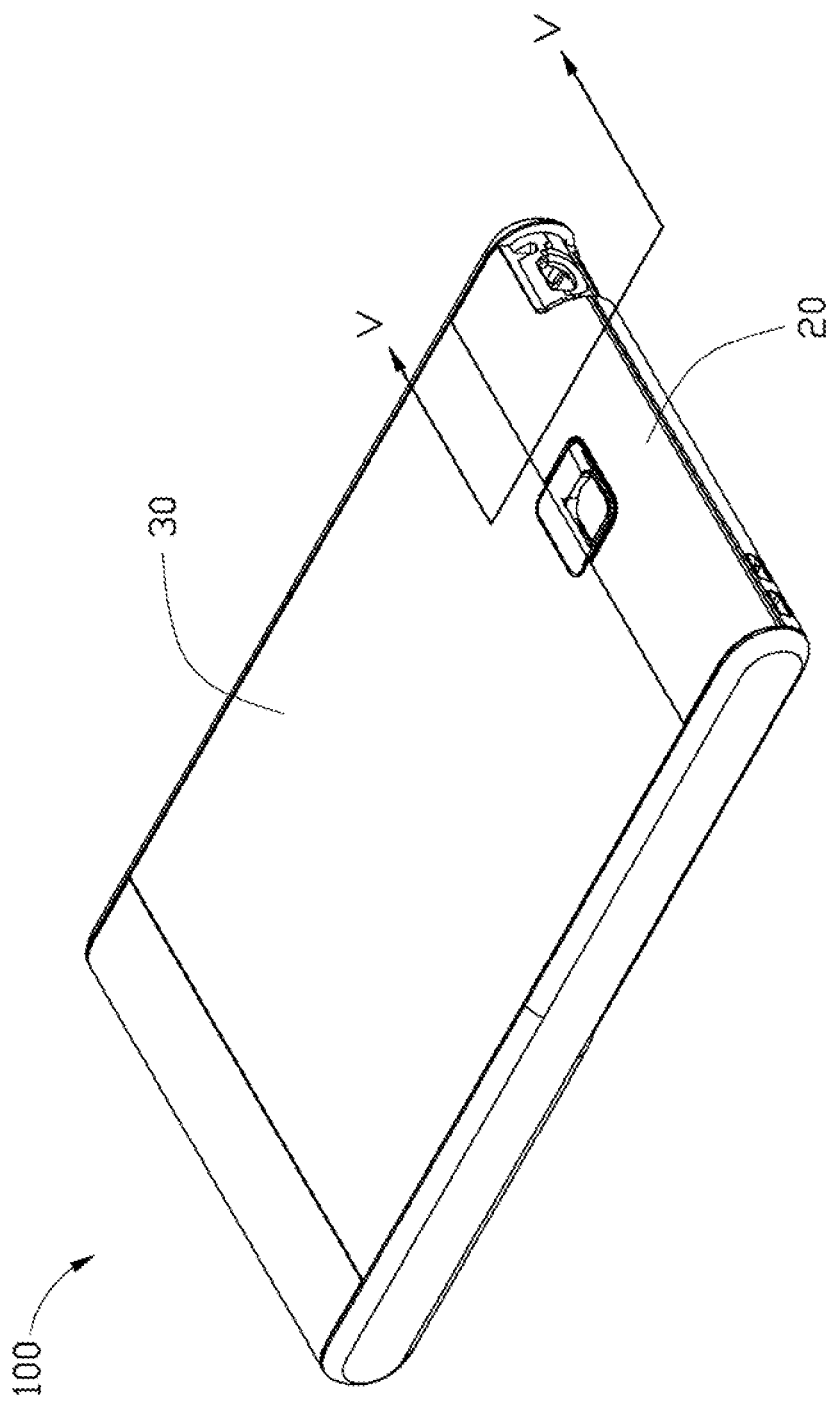
FIG. 4 is a schematic assembled view of the portable electronic device of FIG. 1.
Figure 5:
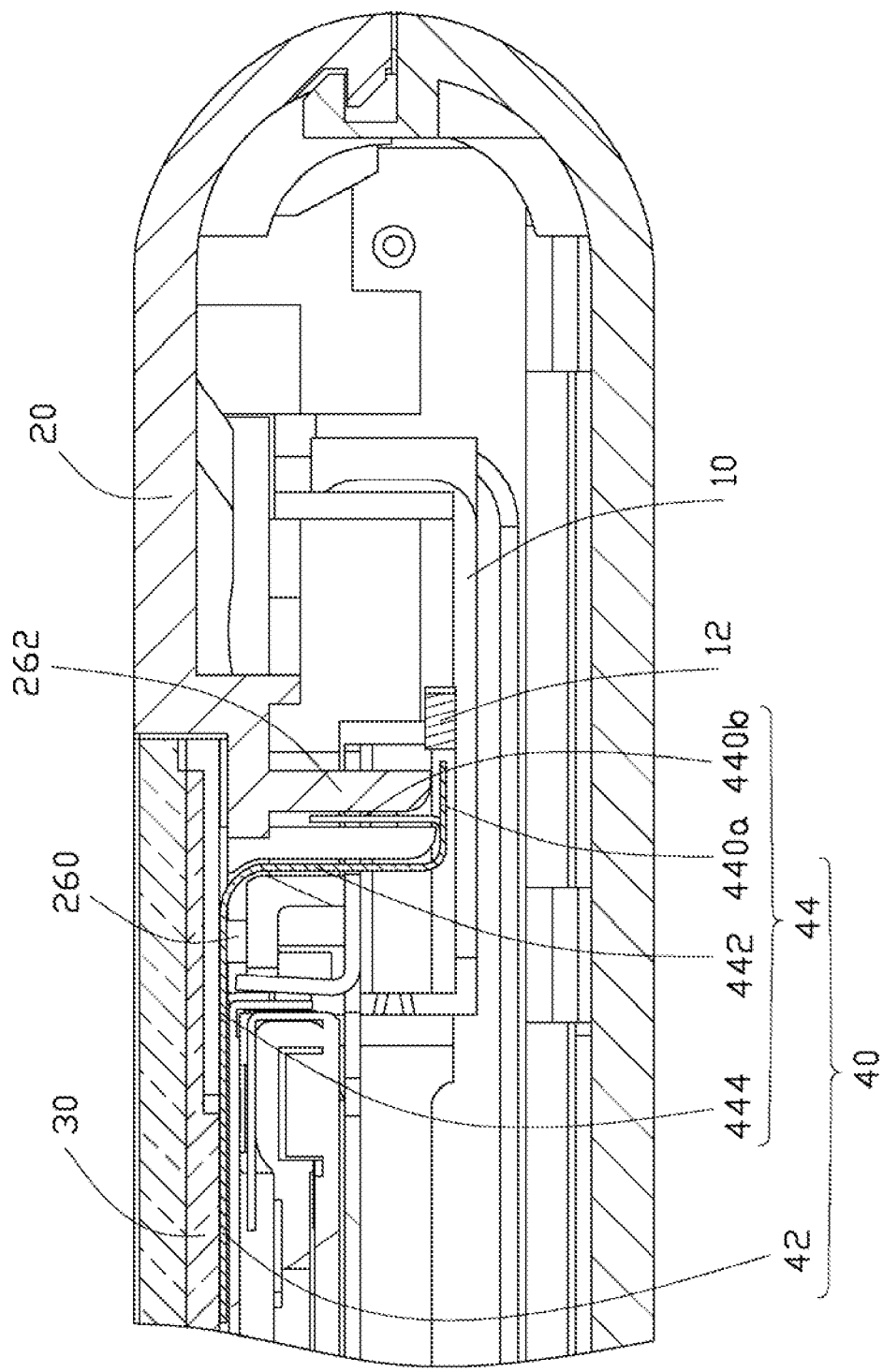
FIG. 5 is a cross-section taken along line V-V of FIG. 4.

Referring to FIGS. 3-5, two pins 260 extend out of the bottom surface of the cover 26 (shown in FIG. 5) perpendicular to the motherboard 10 and two bent latches 262 further extend towards the display screen 30.

The light guide component 40 is disposed between the illuminator 12 and the display screen 30, and is secured by the holding frame 24. In this embodiment, the light guide component 40 is transparent. The light guide component 40 includes a main body 42 and two foot portions 44 extending from an edge thereof.

The main body 42 is received in the receiving opening 240 of the holding frame 24, and attached to the bottom surface of the display screen 30 facing the motherboard 10. The main body 42 includes a light output surface 420 (shown in FIG. 1) contacting the bottom surface of the display screen 30 and a reflecting surface 422 opposite to the light output surface 420. The reflecting surface 422 is coated with a reflecting film to reflect the light towards the light output surface 420.

The two foot portions 44 respectively run through the two corresponding through holes 242. Each foot portion 44 includes a light input portion 440, a light output portion 444, and a light guide portion 442 connecting the light input portion 440 to the light output portion 444. In this embodiment, the light input portion 440, the light guide portion 442 and the light output portion 444 cooperatively form a Z-shape.

The light input portion 440 includes a contact block 440a and a latching block 440b perpendicular to the contact block 440a. The contact block 440a is secured to the motherboard 10 by adhesives. The contact block 440a includes a distal end surface 440c and a number of side surfaces 440d connecting thereto. The distal end surface 440c faces the illuminator 12 to receive light. The side surfaces 440d are coated with a number of total reflectance films (not shown) for reflecting the light to the light guide portion 442. The latching block 440b extends towards the cover 26. The latching block 440b defines a first through hole 440e therein, to receive the latches 262 of the cover 26, so that the light input portion 440 can latch with the cover 26.

The light guide portion 442 runs through the through holes 242 of the holding frame 24, to guide light from the light input portion 440 to the light output portion 444. Specifically, the light guide portion 442 forms two opposite curved angles 442a. One of the curved angles 442a faces the illuminator 12 while the other curved angle 442a faces the display screen 30, then forming a Z-shaped light path. The outer surface of the light guide portion 442 is coated with a number of total reflectance films for reflecting the light to the light output portion 444.

The light output portion 444 can be integrally formed with the main body 42 of the light guide component 40. The light output portion 444 is received in the receiving space 246 of the holding frame 24 and secured to the holding frame 24 by transparent glue. The light output portion 444 further defines two second through holes 444a for receiving the pins 260 of the cover 26.

During assembly, the main body 42 of the light guide component 40 is received in the receiving opening 240 and secured to the holding frame 24. The foot portions 44 of the light guide component 40 respectively run through the through holes 242 and are then secured to the motherboard 10 by glue, with the distal end surface 440c facing the illuminator 12. The cover 26 of the outer shell 20 covers the holding frame 24 and the light guide component 40 is locked to the holding frame 24 and the cover 26.

Pressure on the key 22 causes the illuminator 12 to emit light to the input portion 440 of the light guide component 40. The light is transmitted to the light output portion 444 via the light guide portion 442, reflected to the display screen 30, and dispersed therefrom. As a result, the illuminator 12 can be disposed on the motherboard 10 and no need for an additional printed circuit board, thus, the number of components is reduced and the portable electronic device is more compact.

It is understood that, from the edge of the light output portion 444, a flange can extend to wrap the edge of the display screen 30 for improved luminance thereof.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A portable electronic device comprising:
    a motherboard comprising at least one illuminator disposed thereon;
    a display screen parallel to the motherboard, and
    a light guide component disposed between the illuminator and the display screen, the light guide component comprising:
        a main body attached to a bottom surface of the display screen and comprising a light output surface facing the display screen; and
        at least one foot portion extending from an edge of the main body corresponding to the at least one illuminator, each foot portion comprising a distal end surface facing the illuminator to receive light emitted from the illuminator;
    wherein the light guide component is positioned on an outer shell covering the motherboard, the outer shell comprises a holding frame and a cover attached to the holding frame, and the holding frame defines a first receiving opening configured for receiving part of the light guide component and the display screen and a plurality of through holes therein;
    wherein two pins protrude from the bottom surface of the cover perpendicular to the motherboard and two bent latches protrude towards the display screen, wherein the light guide component defines a plurality of first through holes to receive the latches of the cover and a plurality of second through holes for receiving the pins.

2. The portable electronic device in claim 1, wherein the main body is received in the receiving opening of the holding frame, and disposed between the upper surface of the motherboard and the bottom surface of the display screen.

3. The portable electronic device in claim 2, wherein a bezel surrounds the edge of the first receiving opening, securing the display screen thereon, and the through holes are disposed at a side thereof.

4. The portable electronic device in claim 1, wherein the main body comprises a reflecting surface opposite to the light output surface, the reflecting surface coated with a reflecting film to reflect the light into the display screen.

5. The portable electronic device in claim 1, wherein the light guide component is transparent.

6. The portable electronic device in claim 1, wherein each foot portion of the light guide component comprises a light input portion, a light output portion, and a light guide portion connecting the light input portion to the light output portion, wherein the distal end surface is disposed on the light input portion.

7. The portable electronic device in claim 6, wherein the light input portion, the light guide portion and the light output portion form a Z-shape.

8. The portable electronic device in claim 6, wherein the light input portion comprises a contact block and a latching block, the contact block contacting the motherboard and facing the illuminator, and the latching block perpendicular to the contact block and extending towards the display screen.

9. The portable electronic device in claim 6, wherein the light guide portion forms at least two opposite curved angles, one facing the illuminator and the other facing the display screen.

10. The portable electronic device in claim 6, wherein the light output portion is secured to the holding frame by transparent glue.

11. The portable electronic device in claim 6, wherein the light input portion comprises a plurality of side surfaces connected to the distal end surface, the side surfaces coated with a plurality of total reflectance films for reflecting the light to the light guide portion.

12. The portable electronic device in claim 6, wherein the outer surfaces of the light guide portion are coated with a number of total reflectance films for reflecting the light to the light output portion.

13. A portable electronic device, comprising:
    a motherboard;
    an illuminator positioned on the motherboard;
    a display screen parallel positioned at a side of the motherboard at which the illuminator is positioned; and
    a light guide component sandwiched between the illuminator and the display screen, the light guide component comprising:
        a main body comprising a light output surface attached to the display screen; and
        a foot portion comprising:
            a light output portion extending from an edge of the main body;
            a light guide portion extending from an end of the light output portion opposite to the main body toward the mother board along a direction that is substantially perpendicular to the motherboard; and
            a light input portion extending from an end of the light guide portion opposite to the light output portion toward the illuminator along a direction that is substantially parallel with the motherboard, the light input portion comprising an end surface opposite to the light guide portion and contacting the illuminator.

14. A portable electronic device, comprising:
    a motherboard;
    an illuminator positioned on the motherboard;
    a display screen parallel positioned at a side of the motherboard at which the illuminator is positioned; and
    a light guide component sandwiched between the illuminator and the display screen, the light guide component comprising:
        a main body comprising a light output surface attached to the display screen; and a foot portion extending from an edge of the main body and comprising an end surface opposite to main body, the foot portion being bent such that the end surface contacts the illuminator.

* * * * *